United States Patent [19]

Labedz et al.

[11] Patent Number: 5,251,233
[45] Date of Patent: Oct. 5, 1993

[54] APPARATUS AND METHOD FOR EQUALIZING A CORRUPTED SIGNAL IN A RECEIVER

[75] Inventors: Gerald P. Labedz, Chicago; Michael D. Kotzin, Buffalo Grove; Joseph J. Schuler, Roselle, all of Ill.

[73] Assignee: Motorola, Inc., Schaumburg, Ill.

[21] Appl. No.: 630,922

[22] Filed: Dec. 20, 1990

[51] Int. Cl.$^5$ .............................. H03H 7/30
[52] U.S. Cl. ................... 375/12; 375/15; 375/94; 375/96
[58] Field of Search ............. 375/11, 12, 14, 15, 375/94, 96, 100, 102, 99; 371/43, 44, 45; 341/51

[56] References Cited

U.S. PATENT DOCUMENTS

| | | | |
|---|---|---|---|
| 4,112,370 | 9/1978 | Monsen | 325/40 |
| 4,731,801 | 3/1988 | Hennksson | 375/100 |
| 4,829,543 | 5/1989 | Borth et al. | 375/83 |
| 4,885,757 | 12/1989 | Provence | 375/96 |
| 5,031,193 | 7/1991 | Atkinson et al. | 375/100 |
| 5,081,651 | 1/1992 | Kubo | 341/51 |
| 5,091,918 | 2/1992 | Wales | 375/11 |
| 5,164,959 | 11/1992 | Cai et al. | 375/1 |

OTHER PUBLICATIONS

G. Ungerboeck, "Adaptive Maximum-Likelihood Receiver For Carrier-Modulated Data-Transmission Systems", IEEE Capital Transactions on Capital Communications, vol. Com-22, pp. 624-635, May, 1974.

"Detection, Estimation, and Modulation Theory", Part 1, Harry L. Van Trees, John Wiley and Sons, Inc., 1968, pp. 247-256.

G. D. Forney, "Maximum Likelihood Sequence Estimation of Digital Sequences In The Presence of Intersymbol Interference", IEEE Trans. Information Theory vol. 18 No. 3, May 1972, pp. 363-377.

Primary Examiner—Curtis Kuntz
Assistant Examiner—T. Ghebretinsae
Attorney, Agent, or Firm—Richard A. Sonnentag; Raymond A. Jenski

[57] ABSTRACT

An equalization system for equalizing a corrupted signal is disclosed. The equalization system includes a complex matched filter (400) and a maximum likelihood sequence estimator (MLSE) (405) for removing the effects of phase shift, amplitude variations, intersymbol interference, etc. resulting from multi-pathing and noise contributed by the receiver front end. The system estimates a correlation signal C(t) (505) and synchronizes C(t) 505 to maximize its energy as seen on the taps of the complex matched filter (400). Taps having amplitude coefficients below a predetermined threshold are set to zero to produce a modified CIR estimate. The modified CIR estimate which has had the effects of noise virtually eliminated, is then used to construct the complex matched filter (400) and is also used as input to the MLSE (405) to produce a better equalized data signal.

55 Claims, 5 Drawing Sheets

APPARATUS AND METHOD FOR EQUALIZING A CORRUPTED SIGNAL IN A RECEIVER

FIELD OF THE INVENTION

This invention relates generally to digital radio receivers and more specifically to receivers demodulating multi-path signals using conventional channel equalization techniques.

BACKGROUND OF THE INVENTION

Radio frequency (RF) signals, propagating in typical environments, experience time dispersion. This time dispersion is known as multi-path and is caused by the RF signal being deflected off of various environmental surroundings such as buildings, mountains, moving objects, etc. Such a multi-path signal when received is corrupted by the addition of multiple replicas of the true signal. These replicas have differing amplitude, phase, and time delay with respect to the desired signal. In the receiver, the replicas must be accounted for and compensated for in order to achieve a quality demodulation of the signal. One such corrective measure is to equalize the multi-path signal to essentially achieve such a compensation.

Receivers incorporating equalization techniques to reduce the effects of multi-path are well known in the art. One such receiver is described by G. Ungerboeck, "Adaptive Maximum-Likelihood Receiver For Carrier-Modulated Data-Transmission Systems," *IEEE Transactions on Communications*, Vol. Com-22, pp. 624-635, May 1974. Basically, the received signal, possible corrupted by inter-symbol interference (ISI) due to the multi-path channel, other signals transmitted on the same RF carrier frequency from other parts of the system, known as co-channel interference, and additive noise due to the receiver front end, is equalized through the use of a maximum likelihood sequence estimator (MLSE) equalizer. The MLSE equalizer employs a complex matched fiber (CMF) which is matched to the impulse response of the multi-path channel, and a modified Viterbi algorithm (VA) section, per FIG. 2 in Ungerboeck.

Due to the rapid rate of change of the channel impulse response, coefficients used to construct the complex matched filter, which depend upon an estimate of the channel impulse response, must be generated frequently enough so that the coefficients accurately represent the channel during equalization. These coefficients are typically derived by correlating a predetermined synchronization pattern stored in the receiver with a synchronization pattern modulated with the received signal, the correlation being an estimate of the channel impulse response (there are other techniques, however, which obtain an estimate of the channel impulse response without using an explicit synchronization pattern). The combination of correlating and matched filtering (if the complex matched filter were the correct one) provides the function of removing phase offset between the incoming signal and the receiver's local oscillator and maximizing the signal-to-noise ratio of the received signal. Output from the complex matched filter is passed to the MLSE which accounts for the ISI problem stated earlier. The calculations performed by the MLSE to account for the ISI rely heavily on the channel impulse response estimate and also the complex matched filter derived from the estimated channel impulse response.

In the Group Special Mobile (GSM) Pan European Digital Cellular System, the synchronization sequence used to determine the correlation is relatively short therefore, the complex matched filter coefficients which are produced therefrom are highly susceptible to additive noise, interference, and cross-correlation products. When the correlation is noisy, not only is the matched filtering process adversely affected because the complex matched filter is not properly matched to the channel, but the MLSE processing is also adversely affected as well for the very same reason.

Thus, a need exists for a receiver which improves detection of a corrupted signal using equalization by improving the estimated channel impulse response which is used to generate coefficients for the complex matched filter and also is used by the MLSE.

SUMMARY OF THE INVENTION

An equalization system employed in a communication system receiver equalizes a corrupted data signal which has been detected from a radio channel signal received by the communication system receiver. The equalization system estimates a channel profile signal from the corrupted data signal, modifies the channel profile signal and, using the resulting modified channel profile signal, enhances the corrupted data signal.

DETAILED DESCRIPTION OF A PREFERRED EMBODIMENT

Figure 1:
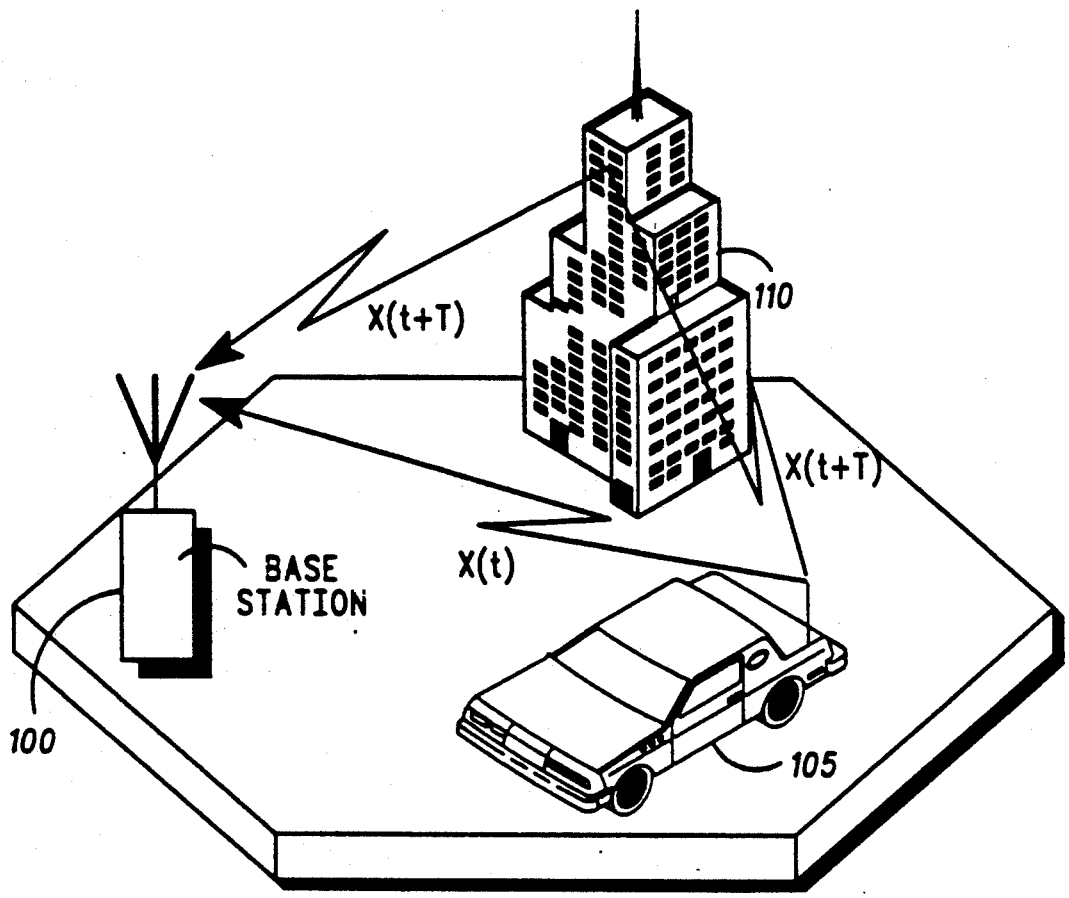
FIG. 1 generally depicts how multi-path signals may be generated.

FIG. 1 generally depicts a radio frequency (RF) environment which may generate multi-path signals. A mobile 105 transmits a signal X(t) to a base-station 100, which in the preferred embodiment is a TDMA system but may equivalently be a FDMA system. Another signal, X(t+T) is received by the base-station 100 but is delayed by T seconds due to a reflection off of an object, such as a building 110. The multi-path signal X(t+T) contains the same information or data as signal X(t) but is delayed in time and also has different amplitude and phase characteristics.

Figure 2:
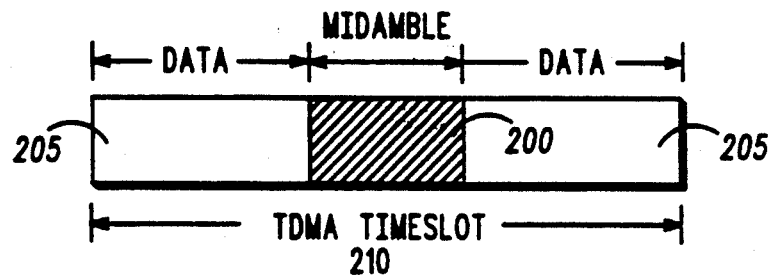
FIG. 2 generally illustrates a GSM TDMA timeslot containing the midamble sequence and message sequence.

FIG. 2 depicts a typical timeslot transmitted by the mobile 105 to the base station 100, and contains the information contained in signal X(t) in FIG. 1. In the preferred embodiment, the TDMA timeslot 210 is 576.9 μs long and contains 148 bits of data representing both message data and synchronization data. The synchronization sequence or midamble 200 is typically the same for signal X(t) for as long as it is transmitted. The message data 205 contains the actual voice data that the mobile 105 transmits to the base station 100 in the form of signal X(t) in FIG. 1. In the preferred embodiment, message and synchronization data in X(t) is sent every eighth TDMA timeslot 210, or every 4.6152 ms.

Figure 3:
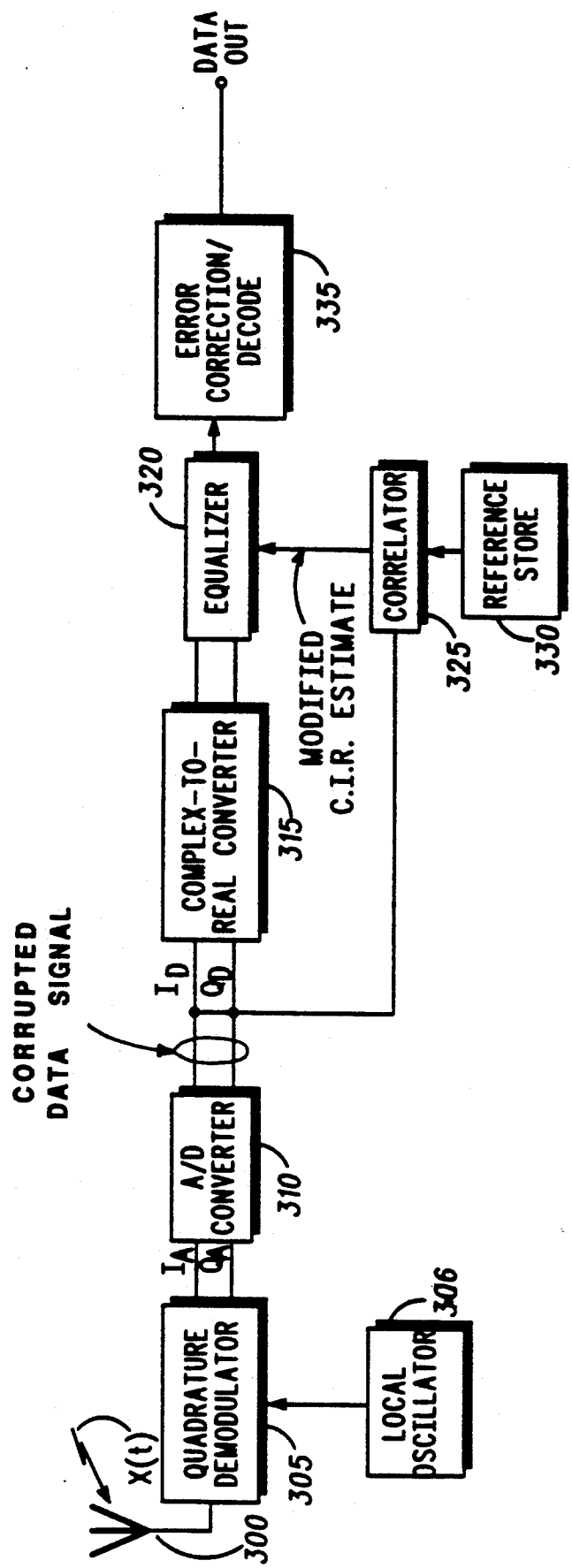
FIG. 3 depicts a typical quadrature receiver that may be adapted to employ the present invention.

FIG. 3 generally depicts an equalizing receiver described by G. Ungerboeck and referenced above which could be adapted in accordance with the invention. In the preferred embodiment, Gaussian Minimum Shift-Keying (GMSK) modulation is employed but other digital signaling schemes such as Quadrature Phase Shift Keying (QPSK) may equivalently be employed. As shown, the receiver comprises an antenna 300 which receives the RF signal X(t) and is coupled to a quadrature demodulator 305. The quadrature demodulator 305 demodulates the RF signal X(t) into an analog in-phase ($I_A$) signal and an analog quadrature phase ($Q_A$) signal re-using a local oscillator (LO) 306 to perform mixing as known in the art. Signals $I_A$ and $Q_A$ have spectra centered at 0 HZ and are input into an analog-to-digital (A/D) converter 310 which converts $I_A$ and $Q_A$ signals into their corresponding digital representation, $I_D$ and $Q_D$. The signals $I_D$ and $Q_D$ are output from the A/D converter 310 and input into a correlator 325 which is coupled to a reference store 330, which in the preferred embodiment is a read-only-memory (ROM) device. The reference store 330 contains a predetermined synchronization sequence associated with the signal X(t), which in the preferred embodiment is one of eight separate midamble sequences used in the correlation process. Continuing, prior to the equalizer 320 receiving $I_D$ and $Q_D$, the correlator 325 correlates the midamble of $I_D$ and $Q_D$ with the stored midamble for that particular TDMA timeslot 210. Output from the correlator 325 is a correlation signal C(t) which is further processed for use by the equalizer 320. The equalizer 320 essentially accounts for the effects of distortion present in the multi-path signal. Output of the equalizer 320 is input into an error correction decoding block 335 which performs signaling specific error correction and message data 205 decoding. The decoded data is ready then for the next processing step.

Figure 4:
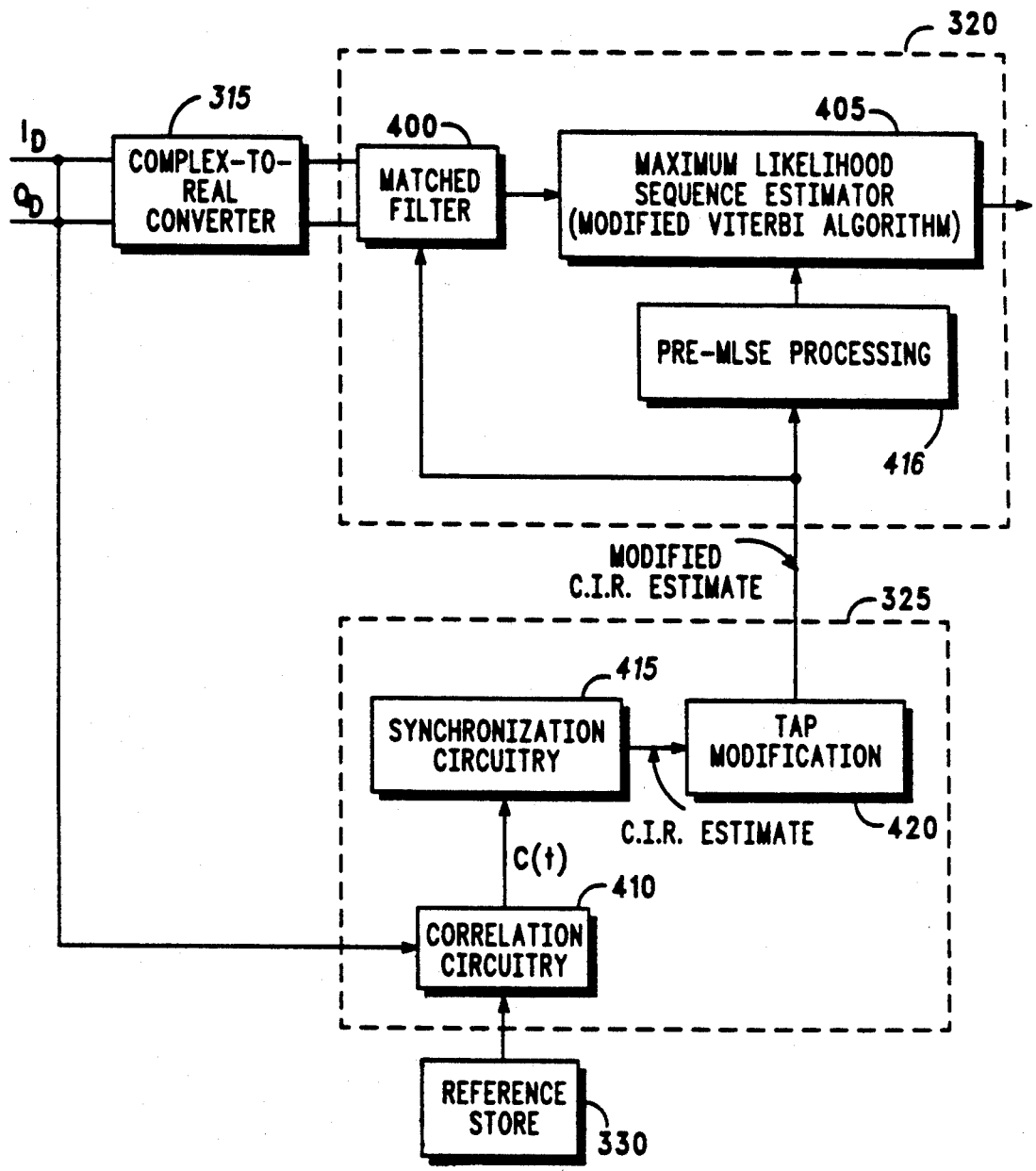
FIG. 4 generally depicts in greater detail the equalizer and correlator blocks of a typical quadrature receiver in accordance with the invention.
Figure 5:
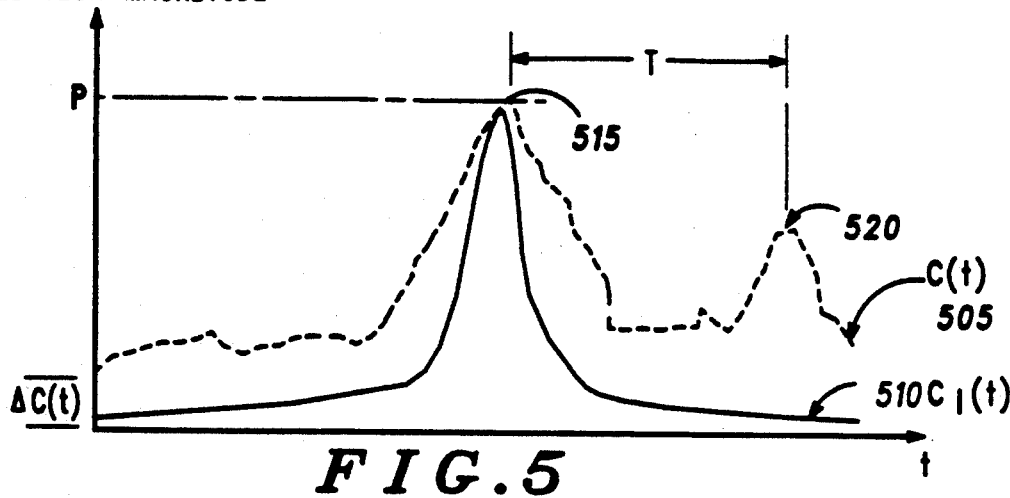
FIG. 5 illustrates a typical correlation signal C(t) resulting from multi-path reception and an ideal correlation signal $C_I(t)$.

FIG. 4 depicts in greater detail, the equalizer 320 and correlator 325 in accordance with the invention. As can be seen, the equalizer 320 is comprised of a complex matched filter 400, a maximum likelihood sequence estimator (MLSE) 405, which in the preferred embodiment uses a modified Viterbi algorithm as described by Ungerboeck, and pre-MLSE processing 416 as described by Ungerboeck. The correlator 325 is comprised of correlation/synchronization circuitry 410 and a tap modification block 420. Operation of the circuitry in FIG. 4 is as follows. Signals $I_D$ and $Q_D$ are input into the correlation circuitry 410 as is the appropriate predetermined midamble retrieved from the reference store 330 which then correlates the midamble of signals $I_D$ and $Q_D$ to the predetermined midamble. The correlation is performed during a predetermined time window which is defined by limits 620 in FIG. 6. The window is adjustable in time and is several bits wider than the midamble 200 of a TDMA timeslot 210. Continuing, output from the correlation circuitry 410 is a correlation signal C(t) 505 which essentially depicts in time the correlation performed by the correlation circuitry 410. FIG. 5 depicts the magnitude of the resulting correlation signal C(t) 505, where the magnitude of the correlation signal C(t) 505 is defined by the equation $$|C(t)| = \sqrt{I_{DN}^2 + Q_{DN}^2}$$

where $I_{DN}$ and $Q_{DN}$ are the nth sample of $I_D$ and $Q_D$ respectively. Also shown in FIG. 5 is the magnitude of the correlation signal $C_I(t)$ 510 for an ideal correlation signal having no corruption and also free of multi-path effects. The effects of the corruption, and more specifically receiver noise, interference, and cross-correlation products is given by the difference ΔC(t) between $C_I(t)$ 510 and C(t) 505 as shown in FIG. 5. The areas of C(t) 505 having correlation magnitudes approximately ΔC(t) above $C_I(t)$ still contain information relating to the message data 205, but for all practical purposes, the information is buried in noise. FIG. 5 also depicts a magnitude peak 515 corresponding to the receiver receiving the true signal X(t) while the magnitude spike 520 represents the receiver receiving the replica signal X(t+T) as shown in FIG. 1.

Figure 8:
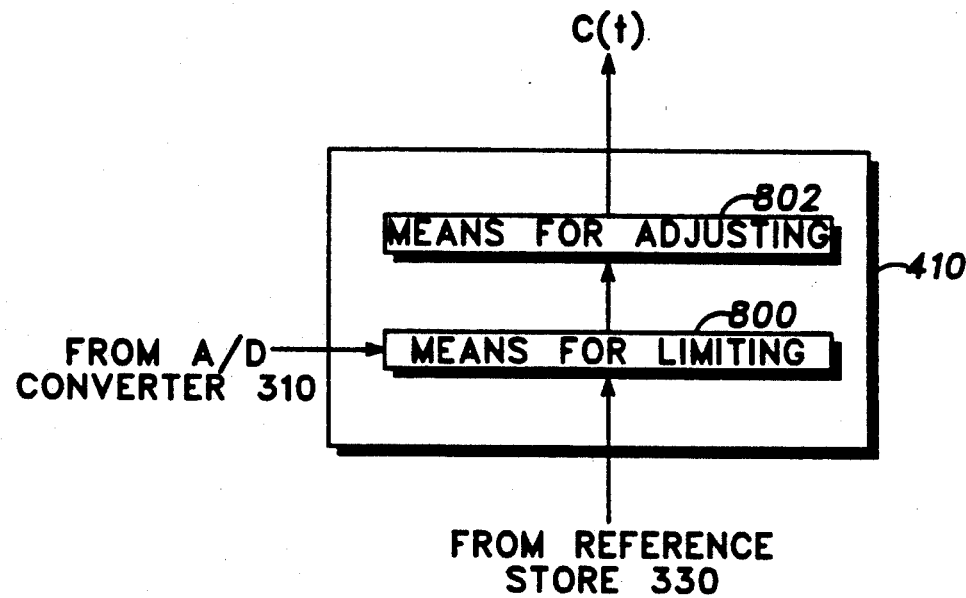
FIG. 8 generally illustrates a more detailed block diagram of correlation circuitry 410.

FIG. 8 generally illustrates a more detailed block diagram of correlation circuitry 410. As depicted in FIG. 8, means for limiting 800 accepts inputs from A/D converter 310 and reference store 330, and limits the correlation to at least the predetermined sequence length, or the length of one TDMA timeslot 210. Output from means for limiting 800 is input into means for adjusting 802, which adjusts the limited correlation to maximize the resulting output, correlation signal C(t) 505.

As is well known in the art, the complex matched filter 400 is constructed on a TDMA timeslot-to-timeslot basis by generating tap coefficients from C(t) 505 which are essentially a channel profile estimate or channel impulse response (CIR) estimate for the particular TDMA timeslot 210. A problem arises however, in that the noise, interference, and cross-correlation products degrade the tap coefficients generated and therefore the complex matched filter 400 constructed for the particular TDMA timeslot 210 does not truly represent the desired response. Thus, the noise corruption on the determined coefficients produces a degradation in performance compared to what could be obtained if the tap coefficient estimate were perfect.

Figure 7:
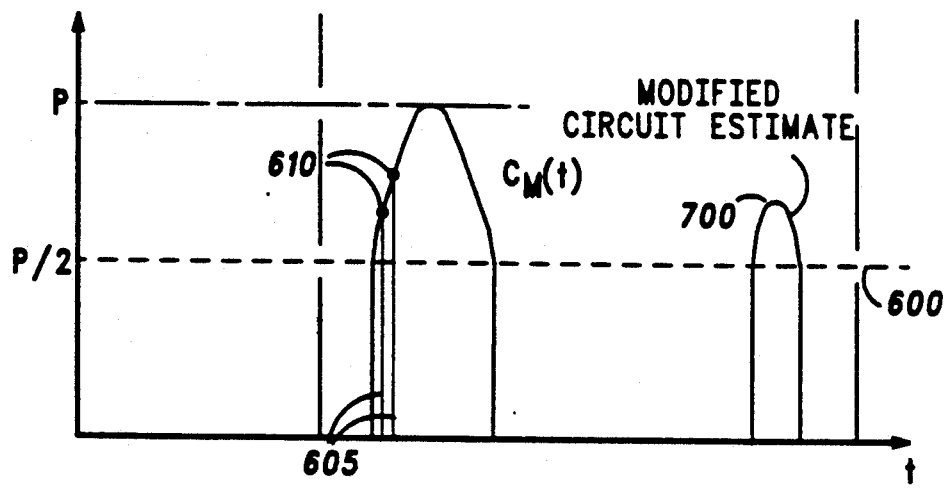
FIG. 7 generally illustrates the correlation signal that is used to construct the complex matched filter in accordance with the invention.
Figure 6:
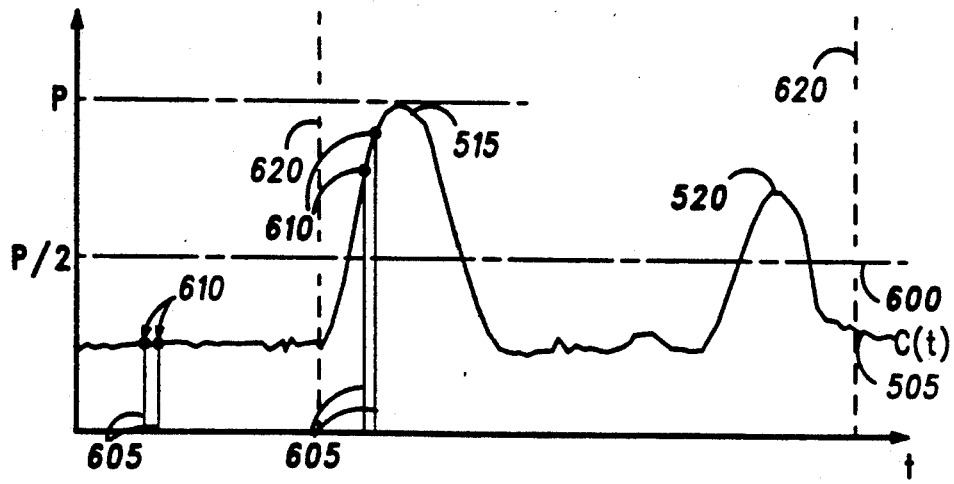
FIG. 6 illustrates how the effects of noise on a typical correlation signal C(t) can be mitigated in accordance with the invention.
Figure 9:
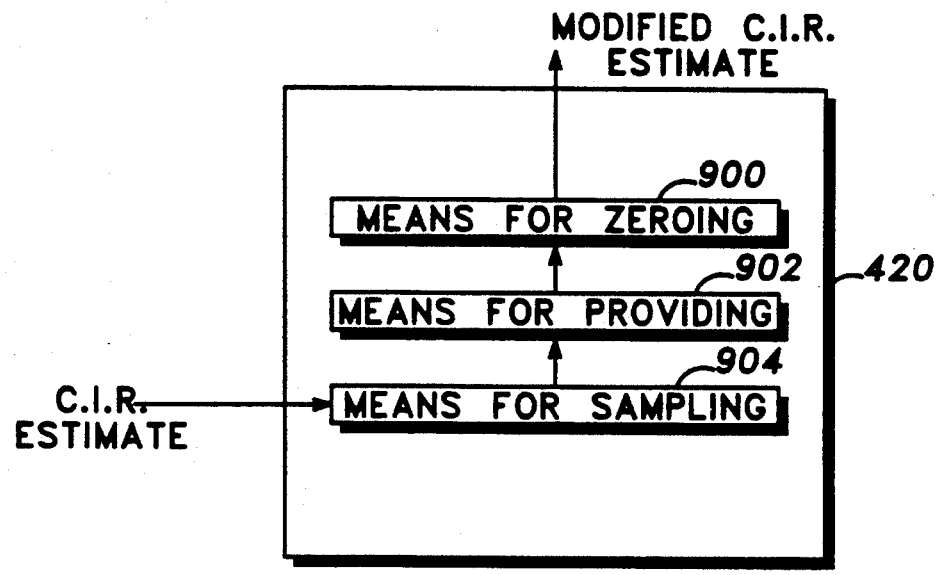
FIG. 9 generally depicts a more detailed block diagram of tap modification block 420 in accordance with the invention.

Returning to FIG. 4, the synchronization circuitry 415 "synchronizes" the correlation signal C(t) 505 defined by maximizing the C(t) 505 as seen on the taps. The output of the synchronization produces tap coefficients which, as stated earlier, are a CIR estimate at the time the TDMA timeslot 210 was sent. As can be seen in FIG. 4, the CIR estimate is input into a tap modification block 420 in accordance with the invention. Again, in typical MLSE receivers such as that of Ungerboeck, the CIR estimate is input directly into the complex matched filter 400 and the pre-MLSE processor 416 without undergoing any modification. Continuing, the tap modification block 420 selectively alters the CIR estimate to yield a modified and improved CIR estimate and hence, improved tap coefficients used to construct the complex matched filter. The tap modification block 420 operates as follows. The incoming CIR estimate, which represents the maximum correlation signal C(t) 505 energy on the taps, is input into the tap modification block 420 where a minimum magnitude threshold 600 is set as shown in FIG. 6, and is provided by means for providing 902 of FIG. 9. In the preferred embodiment, the threshold 600 is approximately ½ the magnitude of the magnitude peak 515. Continuing, the CIR estimate is sampled 605, by means for sampling 904 of FIG. 9, to produce the tap coefficients 610 used to generate the complex matched filter 400. For those samples 605 having tap coefficients 610 below the threshold 600, the samples are assumed to be too corrupted by noise to be of any value in the overall equalization, thus for these samples the tap coefficients are set to zero by means for zeroing 900 of FIG. 9. This is the interesting aspect of the present invention. Instead of using all of the CIR estimate to determine tap coefficients 610 for the complex matched filter 400, it has been found that receiver performance can be improved by zeroing tap coefficients 610 considered to be too noisy. The reason receiver performance is improved is because the small amount of information found in samples having tap coefficients 610 below the threshold 600 is so noisy that it is just better to throw the information away along with the noise. The modified CIR estimate resulting from this selective modification of the CIR estimate is depicted by the signal in FIG. 7. As can be seen, the tap coefficients generated from the modified CIR estimate will more accurately represent the true signal X(t) and the replica signal X(t+T) since the effects of noise have been mitigated. Therefore, more accurate tap coefficients of the desired response can be generated to construct the complex matched filter 400 and consequently the complex matched filter 400 can do a better job of removing phase offsets. In addition, the MLSE 405 also is provided a more true representation of the desired response for the same reasons. Since the complex matched filter 400 is a more accurate representation of the desired signal and also the MLSE 405 has a better representation of the desired signal, the equalization process in the receiver is greatly enhanced consequently resulting in significantly improved receiver performance.

It has furthermore been found that when the preferred embodiment is modified by replacing the MLSE by a data decision device, well known in the art and called a data slicer, that modifying the CIR estimate for the matched filter coefficients according to the present invention produces an improvement similar in magnitude to that of the MLSE present.

Additionally, the invention's usefulness is not limited to Ungerboeck's configuration for the equalizer. Forney proposed a configuration, before Ungerboeck's, in "Maximum Likelihood Sequence Estimation of Digital Sequences In The Presence of Intersymbol Interference", G. D. Forney, *IEEE Trans. Information Theory* vol. 18, No. 3, May, 1972, pp.363-377. In this case the revised estimate of CIR, according to the present invention, would be passed to the MLSE only, since the matched filter in Forney's configuration is matched to an uncorrupted data symbol an not to the channel itself.

What we claim is:

1. An equalization system employed in a communication system receiver to equalize a corrupted data signal, the corrupted data signal having been detected from a radio channel signal received by the communication system receiver, the equalization system comprising:

means for estimating a channel impulse response from the corrupted data signal;

means, coupled to said means for estimating, for modifying said channel impulse response to produce a modified channel impulse response; and means, coupled to the corrupted data signal and said means for modifying, for enhancing the corrupted data signal utilizing said modified channel impulse response.

2. The equalization system of claim 1 wherein the corrupted data signal further comprises at least a message data sequence and a synchronization data sequence, said synchronization data sequence having a predetermined sequence length.

3. The equalization system of claim 2 wherein said means for estimating further comprises means for correlating said synchronization data sequence with a predetermined synchronization sequence to produce a correlation signal.

4. The equalization system of claim 3 wherein said means for correlating further comprises means for limiting said correlation to at least said predetermined sequence length and means for adjusting said limited correlation to maximize said correlation signal.

5. The equalization system of claim 4 wherein said means for modifying said channel impulse response further comprises means for sampling said correlation signal to produce tap coefficients.

6. The equalization system of claim 5 wherein said means for modifying said channel impulse response further comprises means for providing a minimum magnitude threshold.

7. The equalization system of claim 6 wherein said means for providing a minimum magnitude threshold further comprises means for determining which of said tap coefficients are below said minimum magnitude threshold.

8. The equalization system of claim 7 further comprising means, responsive to said means for determining, for zeroing said tap coefficients which are determined to be below said minimum magnitude threshold to produce said modified channel impulse response.

9. The equalization system of claim 8 wherein said means for enhancing further comprises a matched filter tuned from said modified channel impulse response.

10. The equalization system of claim 1 further comprising means, coupled to said means for modifying and said means for enhancing, for estimating the most likely data signal.

11. The equalization system of claim 10 wherein said means for estimating the most likely data signal further comprises means for performing maximum-likelihood sequence estimation calculations.

12. The equalization system of claim 11 wherein said means for performing maximum-likelihood sequence estimation calculations further comprises means for performing a modified Viterbi maximum-likelihood sequence estimation algorithm.

13. The equalization system of claim 1 further comprising means, coupled to said means for enhancing, for estimating the most likely data signal.

14. An equalization system employed in a communication system receiver to equalize a corrupted data signal, the corrupted data signal having been detected from a radio channel signal received by the communication system receiver, the equalization system comprising:

means for estimating a channel impulse response from the corrupted data signal;

means, coupled to said means for estimating, for modifying said channel impulse response to produce a modified channel impulse response;

means, coupled to said means for modifying, for filtering said corrupted data signal; and means, coupled to said means for filtering and said means for modifying, for estimating the most likely data signal.

15. The equalization system of claim 14 wherein the corrupted data signal further comprises at least a message data sequence and a synchronization data sequence, said synchronization data sequence having a predetermined sequence length.

16. The equalization system of claim 15 wherein said means for estimating a channel impulse response further comprises means for correlating said synchronization data sequence with a predetermined synchronization sequence to produce a correlation signal.

17. The equalization system of claim 16 wherein said means for correlating further comprises means for limiting said correlation to at least said predetermined sequence length.

18. The equalization system of claim 17 wherein said means for modifying said channel impulse response further comprises means for sampling said correlation signal to produce tap coefficients.

19. The equalization system of claim 18 wherein said means for modifying said channel impulse response further comprises means for providing a minimum magnitude threshold.

20. The equalization system of claim 19 wherein said means for providing a minimum magnitude threshold further comprises means for determining which of said tap coefficients are below said minimum magnitude threshold.

21. The equalization system of claim 20 further comprising means, responsive to said means for determining, for zeroing said tap coefficients which are determined to be below said minimum magnitude threshold to produce said modified channel impulse response.

22. The equalization system of claim 14 wherein said means for filtering further comprises a matched filter.

23. The equalization system of claim 14 wherein said means for estimating the most likely data signal further comprises means for performing maximum-likelihood sequence estimation calculations.

24. The equalization system of claim 23 wherein said means for performing maximum-likelihood sequence estimation calculations further comprises means for performing a Viterbi maximum-likelihood sequence estimation algorithm.

25. A receiver in a communication system which produces a modified channel impulse response of a radio channel signal, the receiver comprising:

means for receiving the radio channel signal;

means, coupled to said means for receiving, for estimating a channel impulse response, represented by tap coefficients, from said received radio channel signal;

means for providing a minimum magnitude threshold; and means for determining which of said tap coefficients are below said minimum magnitude threshold and means, responsive to said means for determining, for zeroing said tap coefficients which are below said minimum magnitude threshold to produce said modified channel impulse response.

26. The receiver of claim 25 wherein said means for receiving further comprises means for receiving a radio channel signal incorporating a synchronization sequence, said synchronization sequence having a predetermined sequence length.

27. The receiver of claim 26 wherein said means for estimating further comprises means for correlating said synchronization sequence of said received radio channel signal with a predetermined synchronization sequence to produce a correlation signal.

28. The receiver of claim 27 wherein said means for correlating further comprises means for limiting said correlation to at least said predetermined sequence length and means for adjusting said limited correlation to maximize said correlation signal.

29. The receiver of claim 25 wherein said means for determining further comprises means for determining a peak magnitude of said tap coefficients.

30. The receiver of claim 29 wherein said means for determining a peak magnitude further comprises means for providing a minimum magnitude threshold based on said determined peak magnitude of said tap coefficients.

31. A method of equalization employed in a communication system receiver to equalize a corrupted data signal, the corrupted data signal having been detected from a radio channel signal received by the communication system receiver, the method comprising the steps of:

estimating a channel impulse response from the corrupted data signal;

modifying said channel impulse response to produce a modified channel impulse response; and enhancing the corrupted data signal utilizing said modified channel impulse response.

32. The method of claim 31 wherein said corrupted data signal further comprises at least a message data sequence and a synchronization data sequence, said synchronization data sequence having a predetermined sequence length, said step of estimating further comprising correlating said synchronization data sequence with a predetermined synchronization sequence to produce a correlation signal.

33. The method of claim 32 wherein said step of correlating further comprises the step of limiting said correlation to at least said predetermined sequence length and adjusting said limited correlation to maximize said correlation signal.

34. The method of claim 33 wherein said step of modifying said channel impulse response further comprises the step of sampling said correlation signal to produce tap coefficients.

35. The method of claim 34 wherein said step of modifying said channel impulse response further comprises the step of providing a minimum magnitude threshold.

36. The method of claim 35 wherein said step of providing a minimum magnitude threshold further comprises the step of determining which of said tap coefficients are below said minimum magnitude threshold.

37. The method of claim 36 further comprising the step, responsive to said step of determining, of zeroing said tap coefficients which are determined to be below said minimum magnitude threshold to produce said modified channel impulse response.

38. The method of claim 31 further comprising the step of estimating the most likely data signal.

39. The method of claim 38 wherein said step of estimating the most likely data signal further comprises the step of performing maximum-likelihood sequence estimation calculations.

40. The method of claim 39 wherein said step of performing maximum-likelihood sequence estimation calculations further comprises the step of performing a modified Viterbi maximum-likelihood sequence estimation algorithm.

41. A method of equalization employed in a communication system receiver to equalize a corrupted data signal, the corrupted data signal having been detected from a radio channel signal received by the communication system receiver, the method comprising the steps of:
  estimating a channel impulse response from the corrupted data signal;
  modifying said channel impulse response to produce a modified channel impulse response;
  filtering said corrupted data signal; and
  estimating the most likely data signal based on the modified channel impulse response and the filtered corrupted data signal.

42. The method of claim 41 wherein said corrupted data signal further comprises at least a message data sequence and a synchronization data sequence, said synchronization data sequence having a predetermined sequence length, said step of estimating a channel impulse response further comprising the step of correlating said synchronization data sequence with a predetermined synchronization sequence to produce a correlation signal.

43. The method of claim 42 wherein said step of correlating further comprises the step of limiting said correlation to at least said predetermined sequence length.

44. The method of claim 43 wherein said step of modifying said channel impulse response further comprises the step of sampling said correlation signal to produce tap coefficients.

45. The method of claim 44 wherein said step of modifying said channel impulse response further comprises the step of providing a minimum magnitude threshold.

46. The method of claim 45 wherein said step of providing a minimum magnitude threshold further comprises the step of determining which of said tap coefficients are below said minimum magnitude threshold.

47. The method of claim 46 further comprising the step, responsive to said step of determining, of zeroing said tap coefficients which are determined to be below said minimum magnitude threshold to produce said modified channel impulse response.

48. The method of claim 41 wherein said step of estimating the most likely data signal further comprises the step of performing maximum-likelihood sequence estimation calculations.

49. The method of claim 48 wherein said step of performing maximum-likelihood sequence estimation calculations further comprises the step of performing a Viterbi maximum-likelihood sequence estimation algorithm.

50. A method of estimating the channel impulse response of a radio channel signal incorporating a synchronization sequence having a predetermined sequence length in a communication system receiver, the method comprising the steps of:
  receiving the radio channel signal;
  estimating a channel impulse response, represented by tap coefficients, from said received radio channel signal;
  providing a minimum magnitude threshold;
  determining which of said tap coefficients are below said minimum magnitude threshold; and
  zeroing, responsive to said step of determining, said tap coefficients which are below said minimum magnitude threshold to produce said modified channel impulse response.

51. The receiver of claim 50 wherein said step of receiving further comprises the step of receiving a radio channel signal incorporating a synchronization sequence, said synchronization sequence having a predetermined sequence length.

52. The receiver of claim 50 wherein said step of estimating further comprises the steps of correlating said synchronization sequence of said received radio channel signal with a predetermined synchronization sequence to produce a correlation signal.

53. The method of claim 52 wherein said step of correlating further comprises the step of limiting said correlation to at least said predetermined sequence length and adjusting said limited correlation to maximize said correlation signal.

54. The method of claim 50 wherein said step of determining further comprises the step of determining a peak magnitude of said correlation signal.

55. The method of claim 54 wherein said step of determining a peak magnitude further comprises the step of providing a minimum magnitude threshold based on said determined peak magnitude of said tap coefficients.

* * * * *